(12) United States Patent
Ochs

(10) Patent No.: US 6,702,681 B1
(45) Date of Patent: Mar. 9, 2004

(54) TORSIONALLY FLEXIBLE COUPLING

(75) Inventor: Winfried Ochs, Bensheim-Auerbach (DE)

(73) Assignee: Carl Freudenberg, Weinheim (DE)

( * ) Notice: Subject to any disclaimer, the term of this patent is extended or adjusted under 35 U.S.C. 154(b) by 0 days.

(21) Appl. No.: 10/261,607

(22) Filed: Sep. 30, 2002

(51) Int. Cl.[7] .......................... F16F 15/26; F16H 55/14; F16D 3/52; F16N 1/00
(52) U.S. Cl. .............................. 464/90; 464/7; 464/903; 474/94; 74/574
(58) Field of Search ............................... 464/7, 51, 87, 464/89, 91, 90, 92, 96, 150, 180, 181, 903, 902; 474/94, 903; 74/574

(56) References Cited

U.S. PATENT DOCUMENTS

| | | | | |
|---|---|---|---|---|
| 4,781,659 A | * | 11/1988 | Gebhardt | 474/94 |
| 5,139,120 A | * | 8/1992 | Gomi | 188/378 |
| 5,140,868 A | * | 8/1992 | Mizuno et al. | 74/574 |
| 5,449,322 A | * | 9/1995 | Wagner | 464/90 |
| 5,516,331 A | * | 5/1996 | Morr et al. | 464/7 |
| 5,637,041 A | * | 6/1997 | Hamaekers et al. | 464/90 |
| 5,988,015 A | * | 11/1999 | Riu | 74/574 |
| 6,106,421 A | * | 8/2000 | Graber et al. | 474/94 |

FOREIGN PATENT DOCUMENTS

| | | | |
|---|---|---|---|
| DE | 196 43 687 | 4/1998 | |
| DE | 10045453 A1 | * 4/2002 | ........... F16H/55/36 |

* cited by examiner

Primary Examiner—Kenn Thompson
(74) Attorney, Agent, or Firm—Kenyon & Kenyon

(57) ABSTRACT

A torsionally flexible coupling having a rotational axis (1), including a first ring (2) and a second ring (3, 4), which enclose each other [one enclosing the other] at a radial distance, at least one ring-shaped first spring element (5) made of elastomeric material being positioned in the annular clearance (13) formed by the radial distance; and a belt pulley (7) being fastened, relatively having torsional flexibility, to at least one of the rings (2; 3, 4) with the aid of a second spring element (6) made of an elastomeric material, and being supported on at least one of the rings (2; 3, 4) at least in the radial direction with the aid of a sliding bearing (8, 9); the sliding bearing (8, 9) being formed by a rubber layer (9) having at least two embedded sliding rings (8).

28 Claims, 5 Drawing Sheets

TORSIONALLY FLEXIBLE COUPLING

BACKGROUND OF THE INVENTION

1. Field of the Invention

The invention relates generally to a torsionally flexible coupling. More particularly, the invention relates to a torsionally flexible coupling, including a first ring and a second ring which enclose each other at a radial distance, at least one ring-shaped first spring element made of elastomeric material being positioned in the annular clearance formed by the radial distance; and a belt pulley being fastened, relatively having torsional flexibility to at least one of the rings with the aid of a second spring element made of an elastomeric material, and being supported on at least one of the rings at least in the radial direction with the aid of a sliding bearing.

2. Description of Related Art

Such a coupling is known from DE 196 43 687. A bearing ring designed as a bearing is made of a self-lubricating material and touches the belt pulley by being directly adjacent. The sleeve bearing makes possible a good relative motion between the belt pulley and the bearing ring and an exact coordination during a long service life.

SUMMARY OF THE INVENTION

It is an object of the invention to develop a torsionally flexible coupling of the type described above in such a way that the damping properties of the sleeve bearing and the service life improve, at cost-effective production.

These and other objects of the invention are achieved by a torsionally flexible coupling having a rotational axis (1), a first ring (2) and a second ring (3, 4), which enclose each other at a radial distance, at least one ring-shaped first spring element (5) made of elastomeric material being positioned in the annular clearance (13) formed by the radial distance; and a belt pulley (7) being fastened, relatively having torsional flexibility, to at least one of the rings (2; 3, 4) with the aid of a second spring element (6) made of an elastomeric material, and being supported on at least one of the rings (2; 3, 4) at least in the radial direction with the aid of a sliding bearing (8, 9), wherein the sliding bearing (8, 9) is formed by a rubber layer (9) having at least two embedded sliding rings (8).

BRIEF DESCRIPTION OF THE DRAWINGS

The present invention will be described in greater detail with reference to a specific preferred embodiment which is illustrated in the following drawings, wherein.

DETAILED DESCRIPTION OF THE INVENTION

Figure 1:
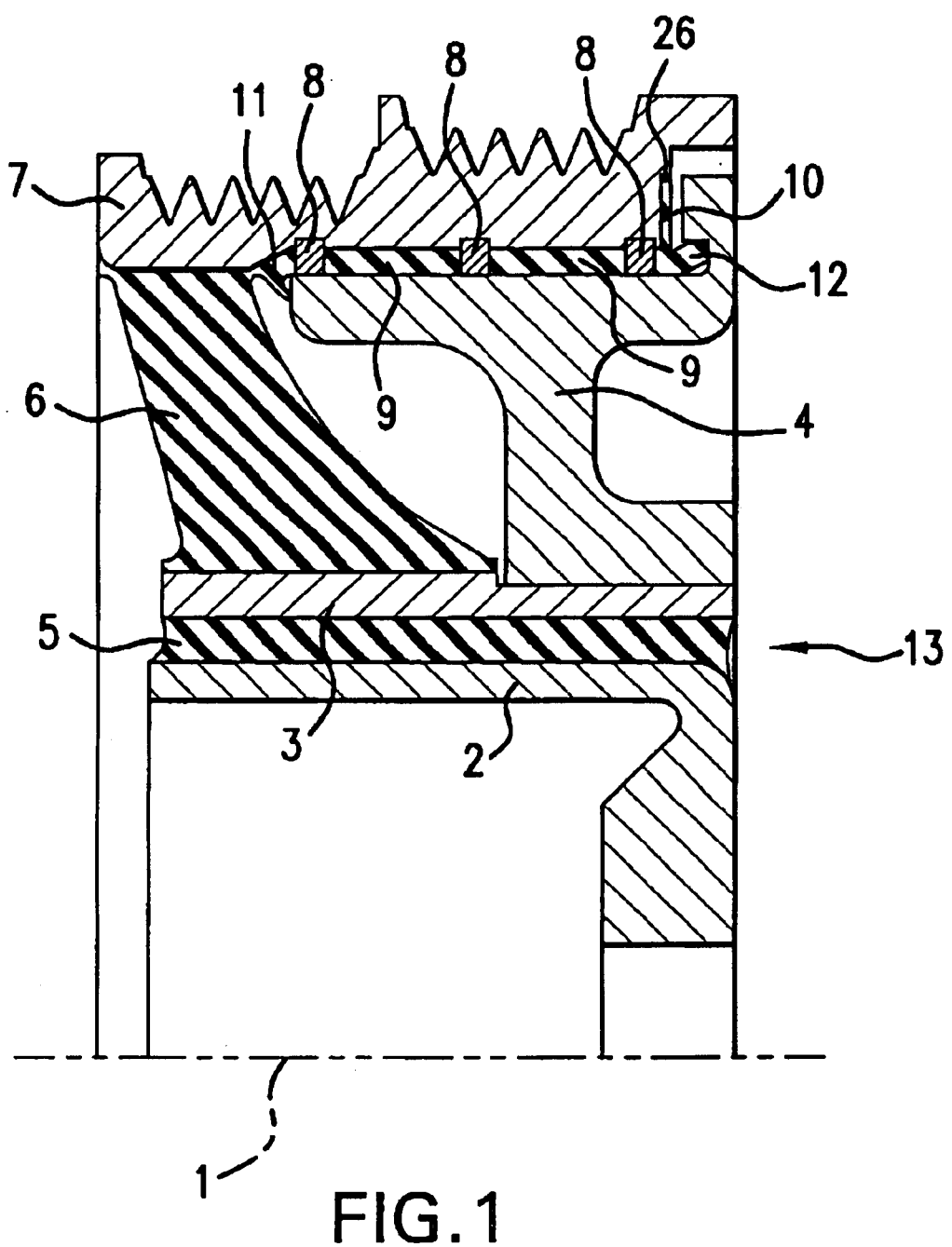
FIG. 1 shows an elastic coupling in half section.

In accordance with the invention, it is provided that the sliding bearing is formed by a rubber layer having at least two embedded sliding rings. With this design of the sliding bearing, an improvement in the damping properties comes about because of the rubber layer, and lower manufacturing costs come about because of the embedded sliding rings. The sliding sleeve commonly used in elastic couplings for radial support is replaced by cost-effective sliding rings. The rubber layer damps the transmitting of sound conducted through solids between the ring and the belt pulley. An exact spatial correspondence of the adjacent and relatively rotatable machine parts is ensured by the sliding rings being made of a tough material. Because of the support of the sliding ring in the elastomer, on the one hand, very low abrasive wear is ensured, and on the other hand, undesired belt noises are damped very effectively.

From a point of view of minimizing friction, it is of great advantage if the rubber layer is supported by at least two supporting beads on a sliding surface on the second ring, in order to form an annular lubrication bore relief. The lubricant bore relief filled with lubricant minimizes the friction between the rubber layer and the sliding surface. As a result the damping properties are maintained over a very long service life.

In order to maintain this friction-reducing effect as unchanged as possible, it is recommended that the rubber layer have sealing lips in axial side areas which are in dynamic sealing contact with associated friction surfaces on the second ring, so as in each case to seal an annular space filled with lubricant. In this specific embodiment, in addition to the lubrication bore relief, the annular hollow space lying in the side areas and enclosed by the elastomer and the second ring, is also filled with lubricant. The rubber layer vulcanized onto the belt pulley thus touches the second ring only at the the ring-shaped supporting beads. In this context, the sliding rings are each situated lying axially outwards from the the supporting beads. The sliding rings are separated from the sliding surface of the second ring by a separating distance. That makes it possible, by the elastic property of the attached sealing lips, to convey the lubricant exiting from the lubricant bore relief back again.

In order to ensure an emergency running property of the sliding bearing, it is of advantage if each sliding ring has a self-lubricating surface area.

In one embodiment of the invention which is preferred because it is particularly cost-saving, it is provided that the sliding rings are made of polytetrafluoroethylene (PTFE), polyamide (PA) or similar materials. Compared to sliding sleeve bearings made of these materials, there comes about not only a savings in material but also an improvement of vibration decoupling. With respect to good heat dissipation, it is of advantage if the sliding rings are made of a metallic material, and the self-lubricating, cylindrical surface area is formed by a coating of polytetrafluoroethylene (PTFE). In this connection, the sliding rings may have slits and be positioned in a groove of the belt pulley.

In order to avoid having non-uniformity of distribution of the lubricant appearing in the lubrication bore relief because of the belt tension, it is favorable if the rubber layer between the supporting beads is furnished with a device for conveying back lubricants. In this context it is of advantage if this device for conveying back the lubricant is formed by grooves having the form of a V-shaped hook profile directed counter to the direction of the belt tension. The lubricant in the lubricant bore relief is conveyed in the opposite direction to the belt tensile stress by this profiling.

From a manufacturing technology point of view, it is of especial advantage if the rubber layer is made as one piece with and of a uniform material with the second spring element. It is thereby possible to vulcanize the rubber layer to the inner side of the ring disk in one work step.

In one preferred exemplary embodiment, it is provided that the sliding bearing supports the belt pulley on a radial projection on the second ring in the axial direction, by a disk-shaped section of the rubber layer extending radially and having at least one embedded sliding ring. Thereby, the elastic coupling may absorb axial forces acting at least on one side, in addition to radial loads dependent on the operating conditions. In this context, the belt pulley is installed always vibrationally decoupled from the two rings, in the case of both radial and axial loading. This bearing system of the belt pulley achieves outstanding damping properties, particularly at high rotary speeds.

For reasons of manufacturing technology, it is of advantage if the second ring is designed as an intermediate ring and a T-shaped bearing ring made of a metallic material, and the intermediate ring and the bearing ring are connected by a frictionally engaged connection or an adhesive connection. The metal rings may be cost-effectively premanufactured of different materials. The bearing ring, which represents the actual damping mass may, for example, be made as a casting.

A construction is preferred in which three sliding rings are embedded in the rubber layer to support the belt pulley in the radial direction, and for supporting the belt pulley in the axial direction, one sliding ring is embedded in the disk-shaped section of the rubber layer. This specific embodiment deserves special mention when the coupling in a motor vehicle is flanged to a crankshaft and drives an accessory. By using this specific embodiment, belt noises are very well suppressed even when the system passes through the resonant range.

For support in the radial direction, it is recommended that one select the inside diameter of the sliding ring to have a size that will maintain a distance to the sliding surface of the bearing ring. The belt pulley is then supported by the supporting beads, i.e. by the elstomeric material and not by a tough material. Sound conducted through solids, that is spreading in the radial direction, is thereby damped especially well. Only when a borderline amplitude is exceeded, does the inner cylinder surface area of the sliding ring act in a limiting fashion and at the same time form an emergency running property in the sliding bearing.

A preferred embodiment of the torsionally flexible coupling is shown in the drawing in FIG. 1 in a half section. The torsionally flexible coupling essentially includes rings situated concentrically to one another, which are fastened into one another by rubber elastic rubber elastic materials. A preferred field of application of torsionally flexible couplings is the driving mechanism of accessories of internal combustion engines. The coupling is flange-mounted on the crankshaft of the internal combustion engine and drives accessories via one or more belt drives. The torsionally elastic coupling prevents torque fluctuations of the crankshaft from being propagated to the belt drive and thus to the accessories. Inner ring 2 has a pot-shaped cross section and is developed as a hub ring, which may be flange-mounted on the crankshaft. This first ring 2 is enclosed concentrically by a second ring 3, 4, this second ring 3, 4 being composed of a bearing ring 4 and an intermediate ring 3. Bearing ring 4 and intermediate ring 3 may be connected, for instance by a press fit. First ring 2 and second ring 3, 4 are separated by an annular clearance 13. In annular clearance 13 a rubber elastic material is vulcanized in, which fastens first ring 2 and second ring 3, 4 to each other at torsional flexibility and forms a first spring element 5. Bearing ring 4, together with intermediate ring 3, forms the damping mass required for damping the crankshaft vibrations. Metallic materials are preferably used for the first and second ring. As shown in the cross sectional drawing in FIG. 1, intermediate ring 3 is connected to belt pulley 7 with the aid of a second spring element 6 made of an elastomeric material. In this context, second spring element 6 fastens the two machine elements belt pulley and intermediate ring at torsional flexibility relatively to each other. The connection has the property of a torsional spring, the elastically yielding behavior being essentially predefined by the selection of the elastomeric material of second spring element 6. Second spring element 6 is also vulcanized onto the belt pulley and the intermediate ring. Belt pulley 7 is supported on bearing ring 4 with the aid of a sliding bearing 8, 9.

According to the present invention sliding bearing 8, 9 is formed by a rubber layer 9 having at least two embedded sliding rings 8. By this design of the sliding bearing, one obtains very good damping properties of the elastic coupling over a very long service life. The propagation of sound conducted through solids is damped by the elastomer layer between the belt pulley and the bearing ring. Belt noises are thereby effectively suppressed even when the system passes through resonance ranges. A durable sliding bearing support and one that is largely independent of centrifugal force is ensured by the rigid sliding ring elements 8 embedded in rubber layer 9. Three sliding rings 8 are shown in FIG. 1. Of course, two or more sliding rings 8 may also be embedded in the rubber layer, depending on the bearing load to be expected. Sliding rings 8 may be slitted rings which are guided in grooves of the belt pulley. In the case of the preferred specific embodiment of the elastic coupling shown in FIG. 1, belt pulley 7 is completely vibrationally decoupled from hub ring 2 and intermediate ring 3. In view of the low coefficient of friction of the machine parts rotatable relatively to each other in the sliding bearing, the good damping properties are maintained over a long service life.

Figure 2:
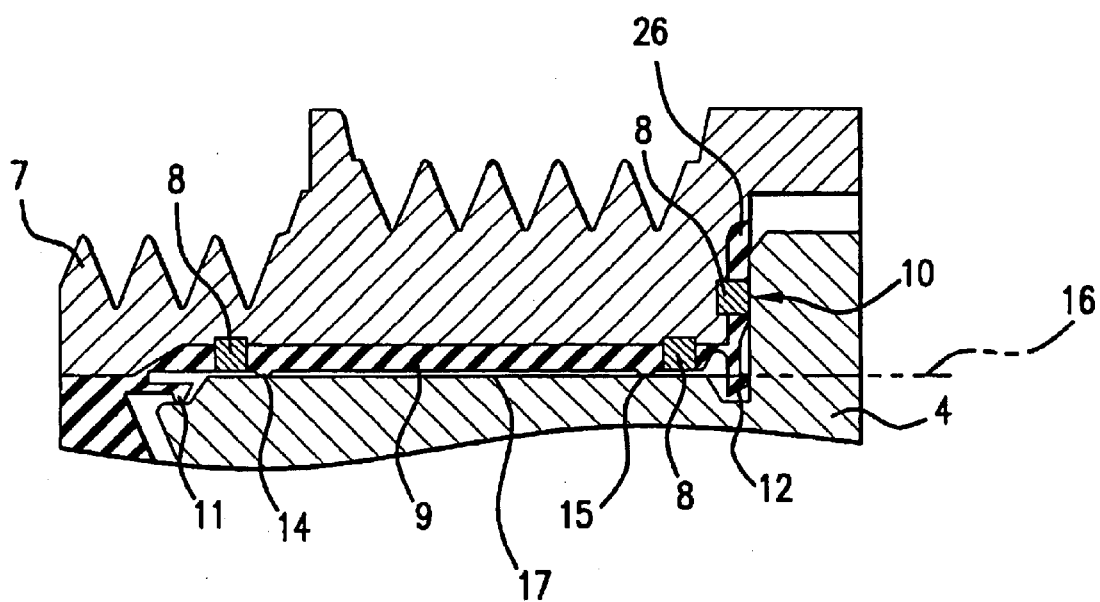
FIG. 2 is a detailed drawing of the sliding bearing of the elastic coupling according to the invention.

FIG. 2 shows a preferred specific embodiment of the sliding bearing of the coupling according to the present invention, enlarged in a detailed drawing. Friction in sliding bearing 8, 9 is minimized by the use of a lubricant which is located in a lubricant bore relief 17. Lubricant bore relief 17 is formed by supporting beads 14, 15 positioned in the axial side regions, whereby rubber layer 9 is distanced from sliding plane 16 of bearing ring 4. Sliding rings 8 are embedded in rubber layer 9, which are also at a distance from the sliding surface. For support in the radial direction, two sliding rings 8 are shown in FIG. 2. A further sliding ring 8 is provided for the support of belt pulley 7 in the axial direction, and is embedded in a disk-shaped section 26 of rubber layer 9. At the end face, disk-shaped section 26 of rubber layer 9 touches a radial projection 27, which is situated on second ring 3, 4. By this arrangement an axial bearing 10 is formed which may absorb one-sided acting axial forces. Each sealing lip has a friction surface 19, 20 on second ring 3, 4 assigned to it. In this context, sealing lip 11 is in close dynamic contact with radial friction surface 19, and sealing lip 12 with axial friction surface 20. The axial side regions of rubber layer 9, in this situation, go over in one piece and as one material into attached sealing lips 11, 12. In the vicinity of sealing lip 11, rubber layer 9 is made in one piece with second spring element 6. Sealing lip 12 is attached to the rubber layer and to pulled up, disk-shaped section 26. This design of the rubber layer has the advantage that vulcanizing onto belt pulley 7 may take place in one work step, and rubber layer 9 may be removed comparatively simply from the mold. Sealing lips 11, 12 each seal one ring space 21, 22 filled with lubricant. They prevent leaking out of lubricant, whereby wear during the entire service life of the elastic coupling is negligibly low.

Figure 3:
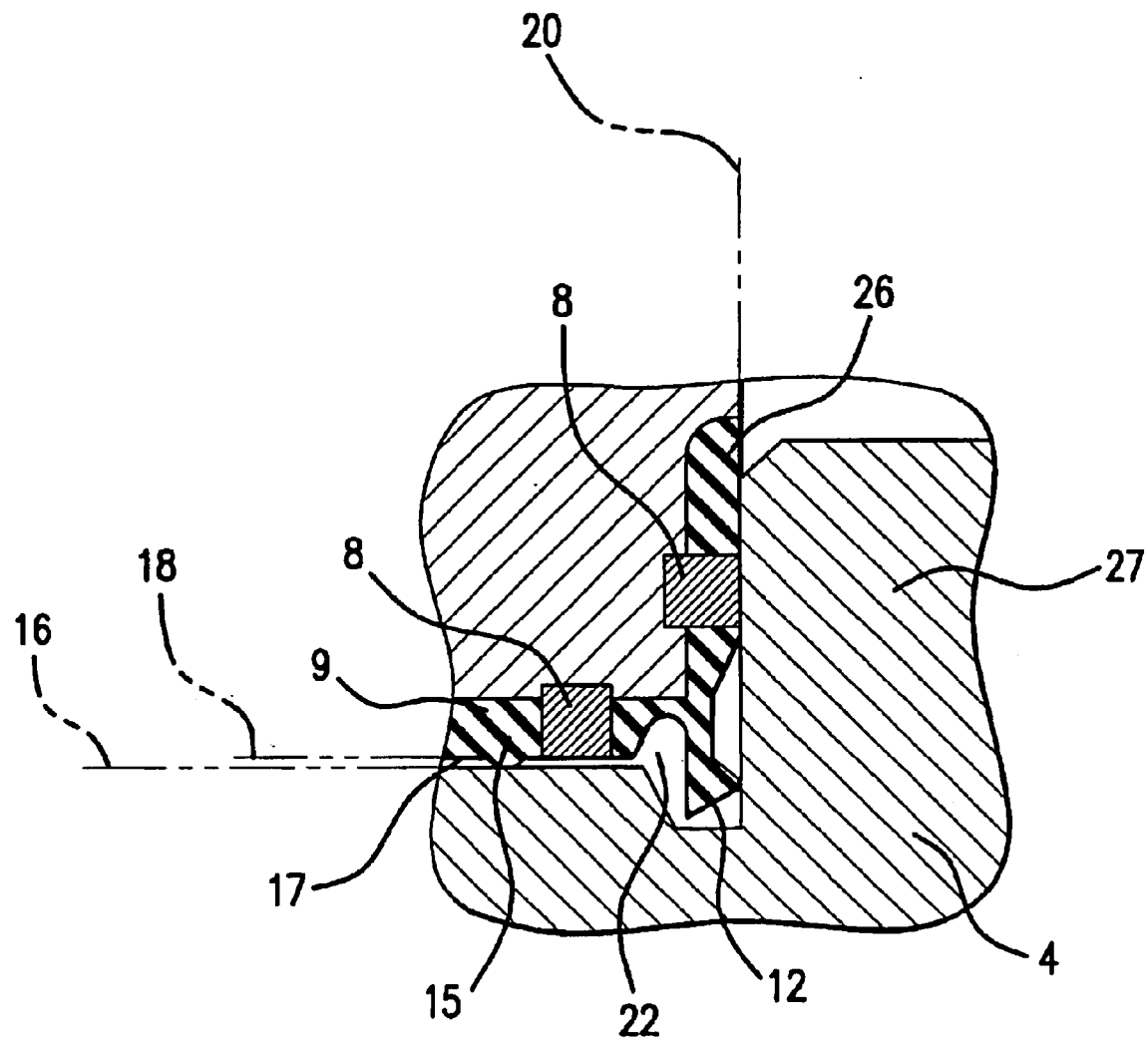
FIG. 3 is a detailed drawing of the axial bearing of the elastic coupling according to the invention.
Figure 4:
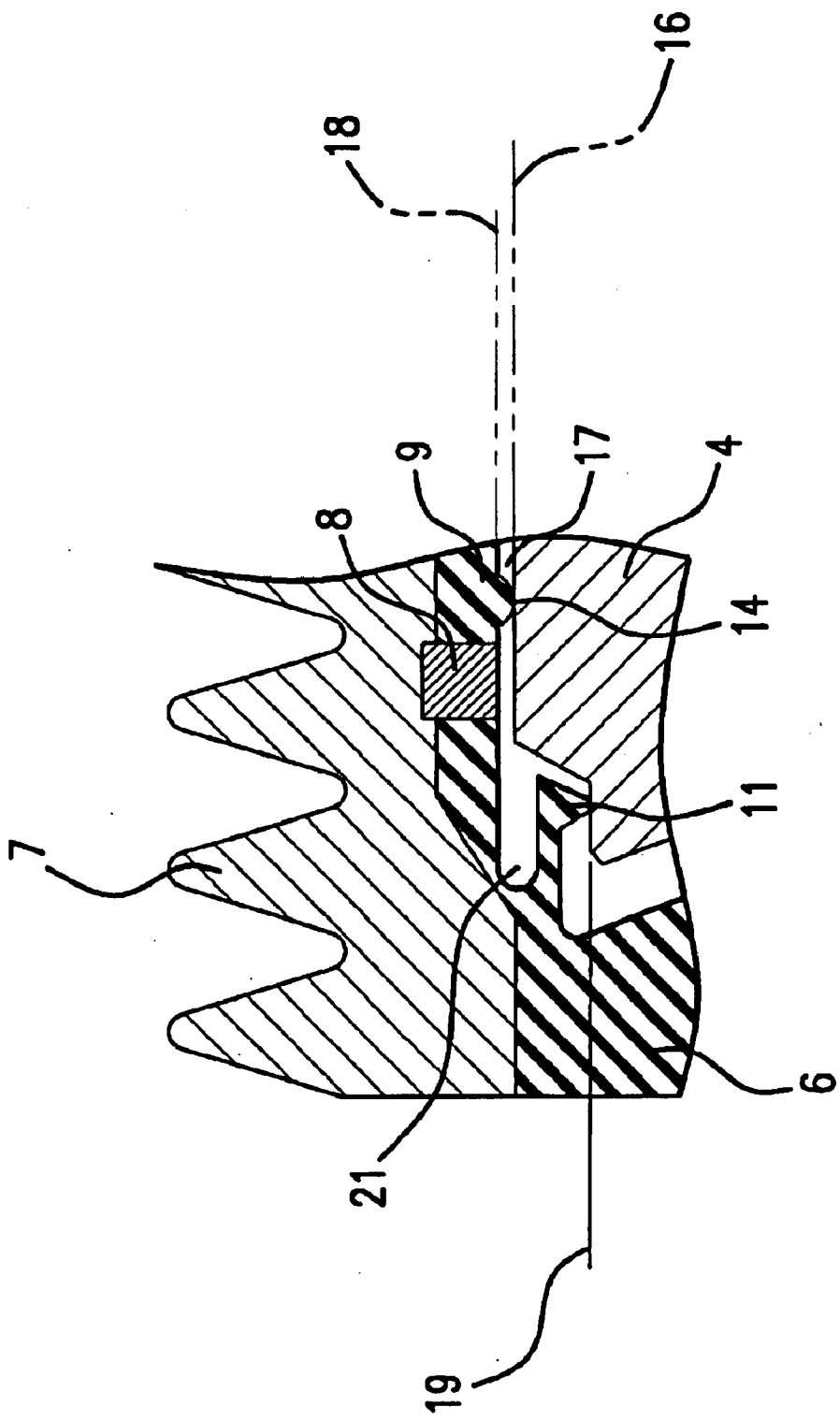
FIG. 4 is a detailed drawing of the elastic coupling according to the invention in the vicinity of the sealing lip bordering the second spring element.

In a greatly enlarged representation, FIGS. 3 and 4 each show a detailed drawing of the coupling according to the present invention, each in axial side regions. FIG. 3 shows axial bearing 10 in an enlarged detail drawing. For the support of belt pulley 7 in the axial direction, a sliding ring 8 is embedded in disk-shaped section 26 of rubber layer. The support is on a friction surface 20 of radial projection 27 on bearing ring 4. For support in the radial direction, FIG. 3 shows a further sliding ring 8 situated in the vicinity of supporting bead 15. As may be recognized in this enlarged representation, this sliding ring 8 situated outside lubricant bore relief 17 next to bead 15 is at a distance from sliding surface 16 of bearing ring 4. Just as lubricant bore relief 17, ring-shaped hollow space 22 is also filled with lubricant. Therefore there is also lubricant in the gap between surface area 18 of sliding ring 8 and sliding surface 16.

The same applies to FIG. 4, in which the sliding bearing of the elastic coupling according to the present invention is shown in an enlarged representation in the region of sealing lip 11 which borders the second spring element. Rubber layer 9 is vulcanized onto the inside of belt pulley and has an axial continuation in the direction of the second sealing element 6, where a sealing lip 11 is attached. Ring space 21 is filled with lubricant, which also fills the gap between surface area 18 of sliding ring 8 and sliding surface 16 of bearing ring 4. Rubber layer 9 touches the bearing ring by supporting bead 14. It becomes clear from the enlarged representations in FIGS. 3 and 4 that the radial support of belt pulley 7 on bearing ring 4 is established by an elastomer. Rigid sliding elements 8 embedded in rubber layer 9 come into sliding contact with sliding surface 16 only after exceeding a radial threshold load. They represent emergency running properties after the exceeding of a radial threshold load. Sliding rings 8, as shown in FIGS. 3 and 4, may be designed as slitted rings which lie in grooves of belt pulley 7. As tough material, both plastic and metal may be used. One advantageous execution of sliding rings 8 is made of polytetrafluoroethylene (CAFE), since this bearing material glazes after a certain amount of initial wear, and [then] has a very resistive, self-lubricating property. Of course, it is also possible to use metal rings as the sliding rings, which are advantageously coated with PTFE on their internal surface area. Heat generated in the friction gap may very well be conducted further by the metal rings to the belt pulley. The use of the material PTFE makes it possible that emergency running properties may be maintained even without lubricant, at low friction.

Figure 5:
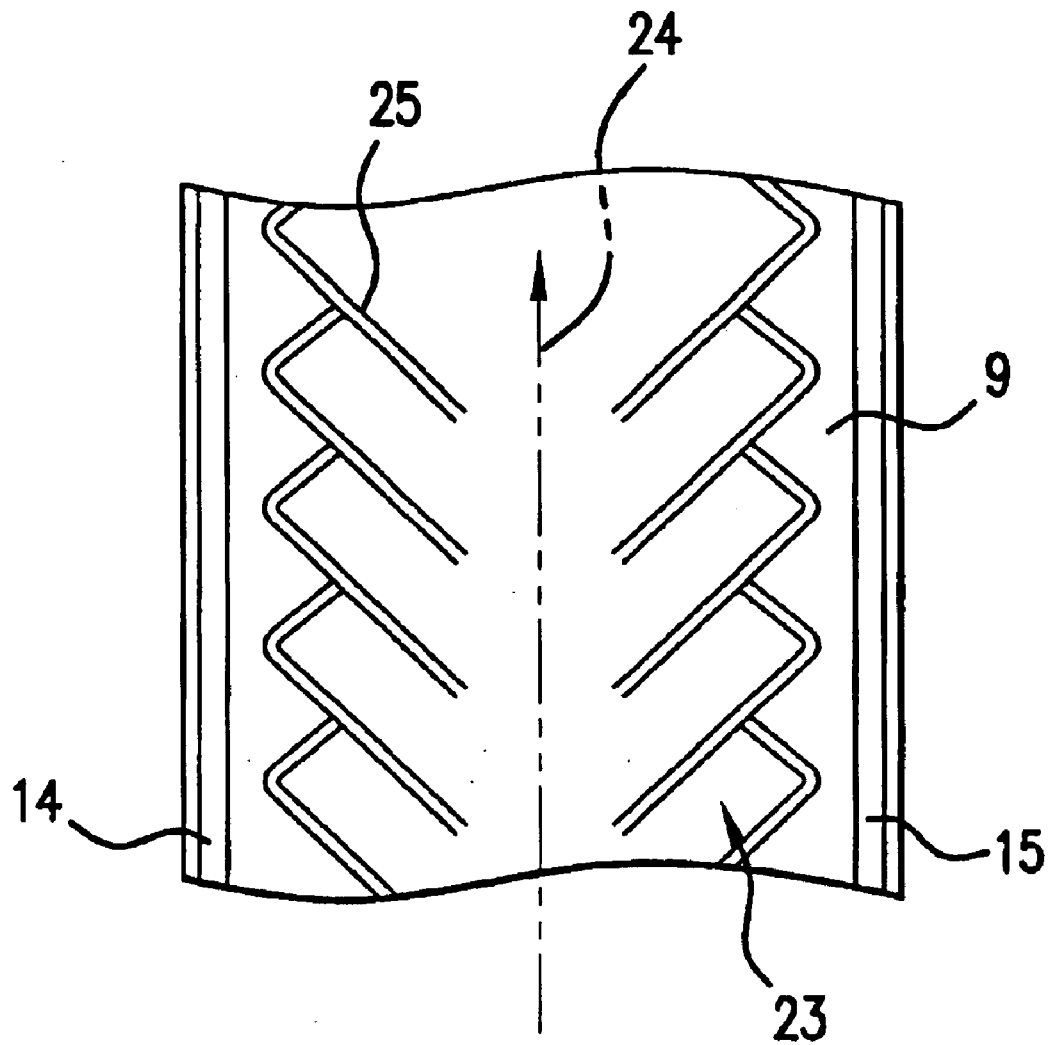
FIG. 5 is a top view of a section of the inner surface of the rubber layer showing the device for the return feed.

FIG. 5 shows a top view of a section of the rubber layer's inner surface, showing the return feed device. Return feed device 23 is made up of grooves 25 which form a coherent channel network of depressions at the surface of rubber layer 9. These depressions form a V-shaped hook profile 25. In this context, the positioning is selected in such a way that the tips of the V-shaped profile are directed counter to the direction of the belt 9 tension, which is shown in FIG. 5 by arrow 24. Each hook of the profile has a short and a long section. The V-shaped direction is predefined by the long sections. The long sections point in the direction of the axis of symmetry, but they are not connected to one another. A short hook section opens out at each long section. In this way it is achieved that the displacement of the lubricant in the lubricant bore relief, which comes about on account of the belt tension, is conveyed counter to the direction of motion of the belt pulley, and that, in the lubricant bore relief, rubber layer 9 remains at a distance from sliding surface 16 of bearing ring 4. Because of that, even under a load, an extremely low coefficient of friction is maintained between the machine elements, whereby, over a very long service life, excellent damping properties of the torsionally flexible coupling may be maintained.

By the use of sliding rings instead of sliding sleeves, the elastic coupling may be manufactured at low cost, due to the present invention. The vulcanization of rubber layer 9 to belt pulley 7 can be done in one work step, together with the vulcanization of the second spring element. The production tool used for the molding during vulcanization is made comparatively simply. Thanks to the present invention, it is also possible to produce a torsionally flexible coupling at comparatively low cost, which over a very long operating timespan exhibits very good vibration-insulating properties.

What is claimed is:

1. A torsionally flexible coupling having a rotational axis (1), comprising: a first ring (2) and a second ring (3, 4), which enclose each other at a radial distance, at least one ring-shaped first spring element (5) made of elastomeric material being positioned in the annular clearance (13) formed by the radial distance; and a belt pulley (7) being fastened, relatively having torsional flexibility, to at least one of the rings (2; 3, 4) with the aid of a second spring element (6) made of an elastomeric material, and being supported on at least one of the rings (2; 3, 4) at least in the radial direction with the aid of a sliding bearing (8, 9), wherein the sliding bearing (8, 9) is formed by a rubber layer (9) having at least two embedded sliding rings (8).

2. A torsionally flexible coupling having a rotational axis (1), comprising: a first ring (2) and a second ring (3. 4), which enclose each other at a radial distance, at least one ring-shaped first spring element (5) made of elastomeric material being positioned in the annular clearance (13) formed by the radial distance; and a belt pulley (7) being fastened, relatively having torsional flexibility, to at least one of the rings (2; 3, 4) with the aid of a second spring element (6) made of an elastomeric material, and being supported on at least one of the rings (2; 3, 4) at least in the radial direction with the aid of a sliding bearing (8, 9), wherein the sliding bearing (8, 9) is formed by a rubber layer (9) having at least two embedded sliding rings (8), wherein the rubber layer (9) is supported by at least two supporting beads (14, 15) on a sliding surface (16) on the second ring (3, 4), to form a ring-shaped lubrication bore relief (17).

3. The coupling according to claim 2, wherein the rubber layer (9) has sealing lips (11, 12) in axial side regions, which are in dynamic sealing contact with assigned friction surfaces (19, 20) on second ring (3, 4), in order for each to seal an annular space (21, 22) filled with lubricant.

4. The coupling according to claim 2, wherein the rubber layer (9) has sealing lips (11, 12) in axial side regions, which are in dynamic sealing contact with assigned friction surfaces (19, 20) on second ring (3, 4), in order for each to seal an annular space (21, 22) filled with lubricant.

5. The coupling according to claim 3, wherein each sliding ring (8) has a self-lubricating surface area (18).

6. The coupling according to claim 4, wherein each sliding ring (8) has a self-lubricating surface area (18).

7. The coupling according to claim 3, wherein the sliding rings (8) are made of polytetrafluoroethylene PTFE.

8. The coupling according to claim 4, wherein the sliding rings (8) are made of polytetraflubroethylene PTFE.

9. The coupling according to claim 3, wherein the sliding rings (8) are made of a metallic material, and the self-lubricating, cylindrical surface area (18) is formed by a coating made of polytetrafluoroethylene PTFE.

10. The coupling according to claim 4, wherein the sliding rings (8) are made of a metallic material, and the self-lubricating, cylindrical surface area i (18) is formed by a coating made of polytetrafluoroethylene PTFE.

11. The coupling according to claim 2, wherein the rubber layer (9) has a return feed device (23) between the supporting beads (14, 15).

12. The coupling according to claim 4, wherein the rubber layer (9) has a return feed device (23) between the supporting beads (14, 15).

13. The coupling according to claim 11, wherein the return feed device (23) is formed by grooves (25) in the rubber layer (9) in the form of a V-shaped hook profile (25) directed counter to the direction of the belt tension (24).

14. The coupling according to claim 10, wherein the rubber: layer (9) is made in one piece and of a uniform material with the second spring element (6).

15. The coupling according to claim 2, wherein the sliding bearing (8, 9) supports the belt pulley (7) in the axial direction by a disk-shaped section (26) of the rubber layer (9), having at least one embedded sliding ring (8), on a radial projection (27) on the second ring (3, 4).

16. The coupling according to claim 2, wherein the sliding bearing (8, 9) supports the belt pulley (7) in the axial direction by a disk-shaped section (26) of the rubber layer (9), having at least one embedded sliding ring (8), on a radial projection (27) on the second ring (3, 4).

17. The coupling according to claim 2, wherein the second ring (3, 4) is formed from an intermediate ring (3) and a T-shaped bearing ring (4) made of a metallic material, and the intermediate ring (3) and the bearing ring (4) are connected by a frictionally engaged or an adhesive connection.

18. The coupling according to claim 2, wherein the second ring (3, 4) is formed from an intermediate ring (3) and a T-shaped bearing ring (4) made of a metallic material, and the intermediate ring (3) and the bearing ring (4) are connected by a frictionally engaged or an adhesive connection.

19. The coupling according to claim 15, wherein for the support of the belt pulley (7) in the radial direction, three sliding rings (8) are embedded in the rubber layer (9), and for the support of the belt pulley (7) in the axial direction, one sliding ring (8) is embedded in the disk-shaped section (26) of the rubber layer (9).

20. The coupling according to claim 19, wherein for the support in the radial direction each of the sliding rings (8) is positioned at a radial distance from the sliding surface (16).

21. The coupling according to claim 1, wherein the rubber layer (9) has sealing lips (11, 12) in axial side regions, which are in dynamic sealing contact with assigned friction surfaces (19, 20) on second ring (3, 4), in order for each to seal an annular space (21, 22) filled with lubricant.

22. The coupling according to claim 21, wherein each sliding ring (8) has a self-lubricating surface area (18).

23. The coupling according to claim 21, wherein the sliding rings (8) are made of polytetrafluoroethylene PTFE.

24. The coupling according to claim 21, wherein the sliding rings (8) are made of a metallic material, and the self-lubricating, cylindrical surface area (18) is formed by a coating made of polytetrafluoroethylene PTFE.

25. The coupling according to claim 1, wherein the sliding bearing (8, 9) supports the belt pulley (7) in the axial direction by a disk-shaped section (26) of the rubber layer (9), having at least one embedded sliding ring (8), on a radial projection (27) on the second ring (3, 4).

26. The coupling according to claim 1, wherein the second ring (3, 4) is formed from an intermediate ring (3) and a T-shaped bearing ring (4) made of metallic material, and the intermediate ring (3) and the bearing ring (4) are connected by a frictionally engaged or an adhesive connection.

27. The coupling according to claim 25, wherein for the support of the belt pulley (7) in the radial direction, three sliding rings (8) are embedded in the rubber layer (9), and for the support of the belt pulley (7) in the axial direction, one sliding ring (8) is embedded in the disk-shaped section (26) of the rubber layer (9).

28. The coupling according to claim 27, wherein for the support in the radial direction each of the sliding rings (8) is positioned at a radial distance from the sliding surface (16).

* * * * *

UNITED STATES PATENT AND TRADEMARK OFFICE
CERTIFICATE OF CORRECTION

PATENT NO. : 6,702,681 B1
DATED : March 9, 2004
INVENTOR(S) : Ochs

It is certified that error appears in the above-identified patent and that said Letters Patent is hereby corrected as shown below:

<u>Title page,</u>
Item [57], ABSTRACT, delete all boldface numbers and the parentheses around them;

<u>Column 5,</u>
Line 12, change "rubber layer." to -- rubber layer 9. --.

<u>Column 6,</u>
Line 67, change "polytetraflubroethylene" to -- polytetrafluoroethylene --.

Signed and Sealed this

Third Day of May, 2005

JON W. DUDAS
*Director of the United States Patent and Trademark Office*